US008413853B2

(12) United States Patent
Behar et al.

(10) Patent No.: US 8,413,853 B2

(45) Date of Patent: Apr. 9, 2013

(54) ATTACHMENT DEVICE AND DISPENSER USING SUCH A DEVICE

(75) Inventors: Alain Behar, Suresnes (FR); Gerard Cornet, Blaru (FR)

(73) Assignee: Aptar France SAS, Le Neubourg (FR)

( * ) Notice: Subject to any disclaimer, the term of this patent is extended or adjusted under 35 U.S.C. 154(b) by 0 days.

(21) Appl. No.: 12/747,424

(22) PCT Filed: Dec. 9, 2008

(86) PCT No.: PCT/FR2008/052253

§ 371 (c)(1), (2), (4) Date: Jun. 10, 2010

(87) PCT Pub. No.: WO2009/080976

PCT Pub. Date: Jul. 2, 2009

(65) Prior Publication Data

US 2010/0264171 A1 Oct. 21, 2010

(30) Foreign Application Priority Data

Dec. 12, 2007 (FR) ..................................... 07 59775

(51) Int. Cl.

| | |
|---|---|
| ***B65D 88/54*** | (2006.01) |
| ***B65D 83/00*** | (2006.01) |
| ***B65D 45/00*** | (2006.01) |
| ***G01F 11/00*** | (2006.01) |

(52) U.S. Cl.

USPC ...................... 222/321.1; 222/402.1; 215/274

(58) Field of Classification Search .................. 222/394, 222/402.1, 320–321.9; 215/216, 224, 273–280

See application file for complete search history.

(56) References Cited

U.S. PATENT DOCUMENTS

| | | | | |
|---|---|---|---|---|
| 4,773,553 | A * | 9/1988 | Van Brocklin | 215/274 |
| 5,562,219 | A | 10/1996 | de Pous et al. | |
| 5,799,810 | A * | 9/1998 | de Pous et al. | 222/321.9 |
| 6,463,650 | B1 | 10/2002 | Bougamont et al. | |
| 6,595,395 | B2 * | 7/2003 | Jourdin et al. | 222/321.9 |
| 6,772,913 | B2 * | 8/2004 | Garcia et al. | 222/153.09 |
| 6,935,540 | B2 * | 8/2005 | Ackermann | 222/321.9 |
| 7,451,899 | B2 * | 11/2008 | de Pous | 222/321.9 |
| 2005/0061834 | A1 * | 3/2005 | Garcia et al. | 222/321.7 |

FOREIGN PATENT DOCUMENTS

| | | | |
|---|---|---|---|
| EP | 0 704 251 | A2 | 4/1996 |
| FR | 2 769 860 | A1 | 4/1999 |
| FR | 2 859 983 | A1 | 3/2005 |
| GB | 1 590 267 | A | 5/1981 |

* cited by examiner

*Primary Examiner* — Kevin P Shaver

*Assistant Examiner* — Matthew Lembo

(74) *Attorney, Agent, or Firm* — Sughrue Mion, PLLC

(57) ABSTRACT

A fastener device for fastening a dispenser member (4) on a neck (11) of a fluid reservoir (1), the device including: a fastener ring (2) including a reception mechanism (21) and a fastener mechanism (23) for engaging around the neck (11) of the reservoir (1); and a blocking hoop (3) engaged around the ring (2) and movable relative to the ring between a provisional pre-assembled position and a final assembled position. The hoop (3) includes a clearance section (32) that, in the provisional position, is disposed around the fastener mechanism (23), but with an intermediate clearance gap (E), so as to enable the fastener mechanism (23) to move radially outwards without being hindered by the hoop (3), and is offset axially in the final position relative to the fastener mechanism (23), so as to enable the hoop to block the ring (2) on the neck (11).

12 Claims, 2 Drawing Sheets

ATTACHMENT DEVICE AND DISPENSER USING SUCH A DEVICE

Figure 1:
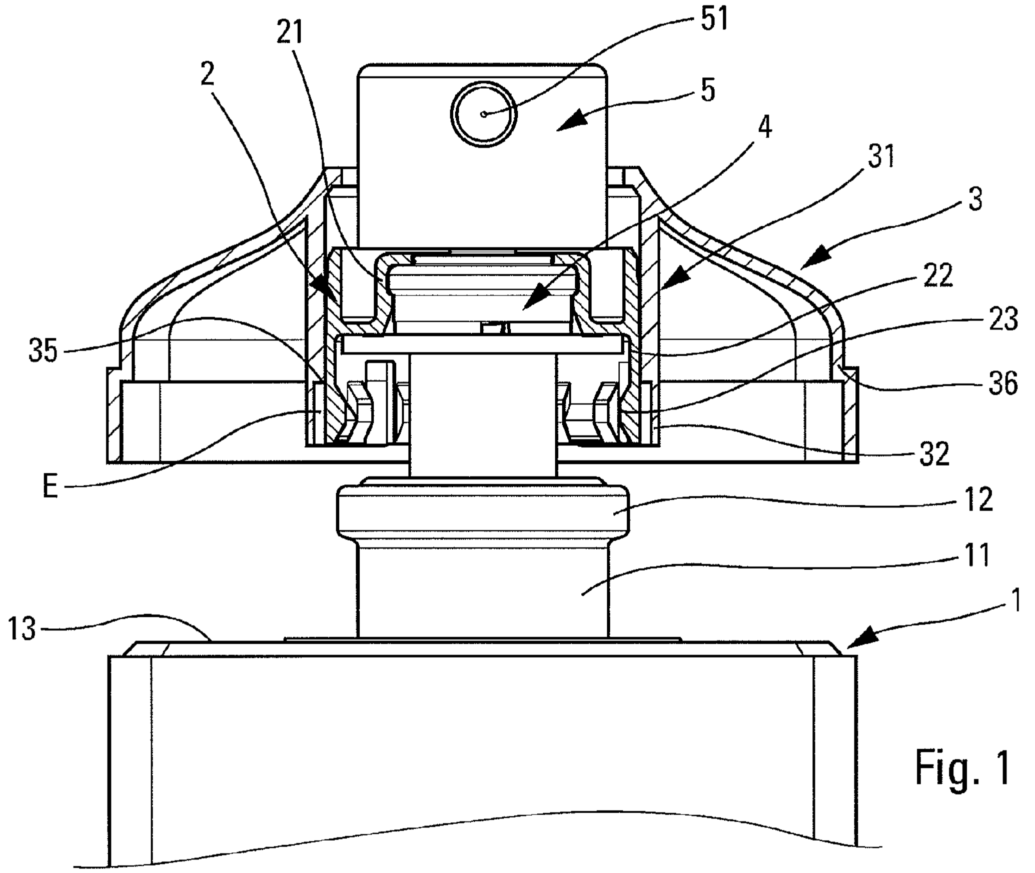

The present invention relates to a fastener device for fastening a dispenser member, such as a pump or a valve, on a neck of a fluid reservoir so as to constitute a fluid dispenser, the device comprising: a fastener ring including both reception means for receiving the dispenser member, and fastener means for coming into engagement around the neck of the reservoir; and a blocking hoop that is engaged around the ring and that is movable axially relative to the ring between a provisional pre-assembled position and a final assembled position, the hoop being engaged around the fastener means of the ring so as to block them around the neck in the final assembled position. Advantageous fields of application of the present invention are the fields of perfumery, cosmetics, or even pharmacy.

This type of fastener system using a fastener ring associated with a blocking hoop is already known in the prior art. In general, the fastener ring includes reception means, e.g. a housing, making it possible to receive the dispenser member that can, for example, include a projecting collar for engaging by snap-fastening in the housing of the ring. In addition to the reception means, the fastener ring also includes a fastener skirt of substantially cylindrical shape defining an inside wall that is provided with one or more fastener profiles for coming into engagement with the neck of the reservoir. Conventionally, the neck of the reservoir forms a projecting annular outer reinforcement below which the fastener profile(s) are engaged in the final assembled position. The function of the blocking hoop is to prevent the inner profile(s) of the skirt of the ring from becoming disengaged from below the projecting outer reinforcement of the neck. In other words, the blocking hoop holds the fastener profile(s) of the ring captive against the neck of the reservoir. To enable the profile(s) to pass beyond and below the projecting annular reinforcement of the neck, it is possible to make the skirt of the ring with longitudinal slots so as to divide the skirt into a plurality of tabs that are separated by slots. In a variant, it is possible to leave the skirt continuous, and to take advantage of the elasticity and the deformability of the skirt in order to enable the fastener profile(s) to pass over the projecting annular reinforcement of the neck. Either way, it is necessary for the skirt of the ring to be able to deform radially outwards while passing over the reinforcement of the neck. The function of the blocking hoop is to prevent the skirt of the ring from deforming radially outwards once the fastener profile(s) is/are engaged below the reinforcement of the neck.

In general, the final assembled position in which the blocking hoop prevents the ring from becoming disengaged from the neck is a permanent position, in the sense that it is no longer possible to remove the blocking hoop from the ring so as to enable the ring to be removed from the neck. Consequently, in order to remove a dispenser unit using such a fastener system, it is necessary to destroy the hoop, the ring, or the neck. The hoop is held on strongly, such that its resistance to traction cannot be overcome by axially pulling on the hoop, without damaging or destroying it.

Before the fastener device is assembled on the neck of the reservoir, the blocking hoop is generally pre-assembled in its provisional position on the fastener ring, in such a manner as to allow the fastener means to deform radially outwards. In general, in the provisional pre-assembled position, the bottom end of the hoop is situated above the fastener means. Consequently, the fastener means project beyond the bottom end of the hoop. In other words, the fastener means of the ring are not situated inside the hoop, and as a result are not protected. The fastener means of the ring constitute the most fragile element of the ring+hoop fastener system, given that they are deformable, since they are engaged around the neck of the reservoir by deforming radially outwards. When the fastener means are formed by a slotted skirt, constituted by tabs that are separated by slots, the risk of deterioration is even higher, given that the tabs, which are easily deformable, may catch on any object and may be deformed in irreversible manner. The fastener ring can then no longer be used. There is thus a real and significant risk of the fastener ring, and more particularly its fastener means, deteriorating in the provisional pre-assembled position.

An object of the present invention is to remedy the above-mentioned drawback of the prior art by defining a ring+hoop fastener device that is particularly tough and strong, even in the provisional position in which it is pre-assembled. Providing manufacture, implementation, and assembly that are simple and low cost are also objects of the present invention.

To achieve these objects, the present invention proposes a fastener device for fastening a dispenser member, such as a pump or a valve, on a neck of a fluid reservoir so as to constitute a fluid dispenser, the device comprising: a fastener ring including both reception means for receiving the dispenser member, and fastener means for coming into engagement around the neck of the reservoir; and a blocking hoop that is engaged around the ring and that is movable axially relative to the ring between a provisional pre-assembled position and a final assembled position, the fastener means of the ring being free to move radially outwards in the provisional pre-assembled position so as to make it possible to assemble the ring on the reservoir neck, the hoop being engaged around the fastener means of the ring so as to block them around the neck in the final assembled position; the fastener device being characterized in that the hoop includes a clearance section that, in the provisional pre-assembled position, is disposed around the fastener means, but with an intermediate clearance gap separating them, so as to enable the fastener means to move radially outwards without being hindered by the hoop, and is offset axially in the final assembled position relative to the fastener means, so as to enable the hoop to block the ring on the neck. Thus, the clearance section protects the fastener means of the ring by forming a protective peripheral belt. Compared to blocking hoops of the prior art, the clearance section constitutes an extension or prolongation section that surrounds the fastener means.

In an advantageous embodiment, the ring is inscribed entirely within the hoop in the provisional pre-assembled position, the clearance section masking the fastener means. According to another advantageous characteristic, the clearance section presents a bottom end edge that extends axially at least up to the same level as a bottom end of the ring. It is not excluded that the bottom end edge of the clearance section extends below the bottom end of the ring or of the fastener means. Either way, the fastener means of the ring are guaranteed to be thoroughly protected inside the hoop. And even beyond any risk of the ring deteriorating, any risk of the hoop separating from the ring in the provisional pre-assembled position is avoided, given that there is practically no longer any engagement on the ring.

According to an advantageous characteristic of the invention, the clearance section is connected to a blocking section that comes to be engaged around the fastener means in the final assembled position.

Advantageously, the clearance section presents a thinner wall relative to the blocking section. Preferably, the blocking section and the clearance section are connected together, forming an internal shoulder that is situated axially above the fastener means in the provisional position, and below the fastener means in the final position. Compared to a blocking hoop of the prior art, the blocking hoop of the present invention extends downwards from the internal shoulder, which, in a conventional blocking hoop, forms the bottom edge.

In an advantageous embodiment, the blocking hoop is surrounded by a covering hoop that is advantageously formed integrally with the blocking hoop. The two hoops together form a covering and blocking piece.

The present invention also defines a fluid dispenser comprising: a fluid reservoir having a neck that projects from a reservoir body, the neck forming an external annular reinforcement; a dispenser member, such as a pump or a valve; and a fastener device according to any preceding claim, the fastener means coming to be engaged below the annular reinforcement of the neck. Advantageously, the clearance section comes into abutment against the reservoir in the final assembled position.

A principle of the invention is to provide a blocking hoop section that extends around the fastener means of the ring in the provisional pre-assembled position, in which position the fastener means can be moved radially outwards so as to be put into place on a reservoir neck.

The invention is described more fully below with reference to the accompanying drawings which show an embodiment of the invention by way of non-limiting example.

Figure 2:
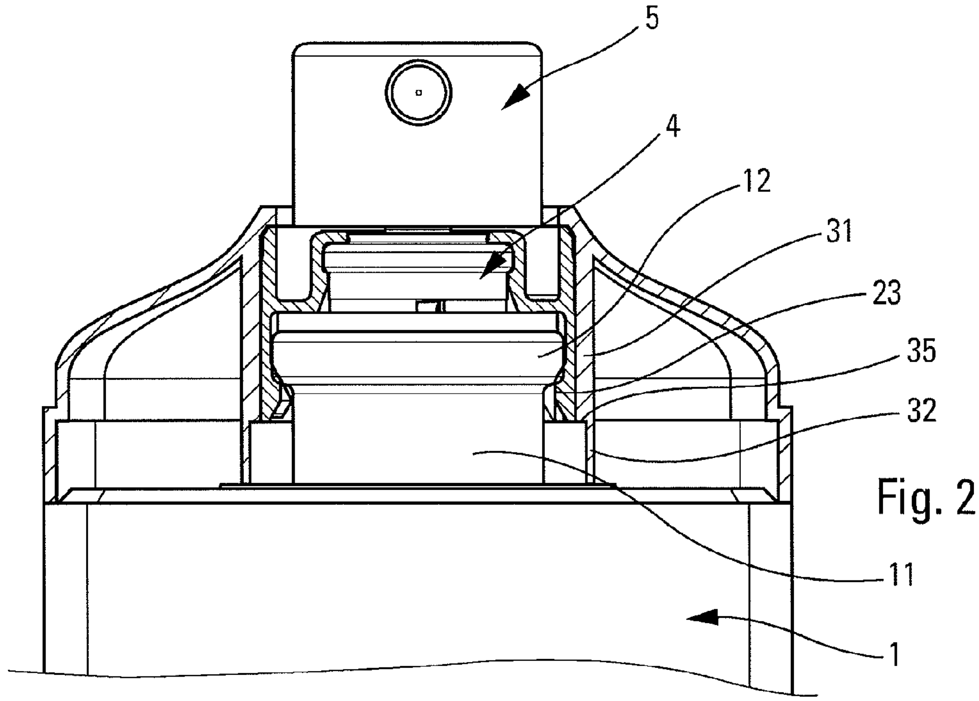
Figure 3:
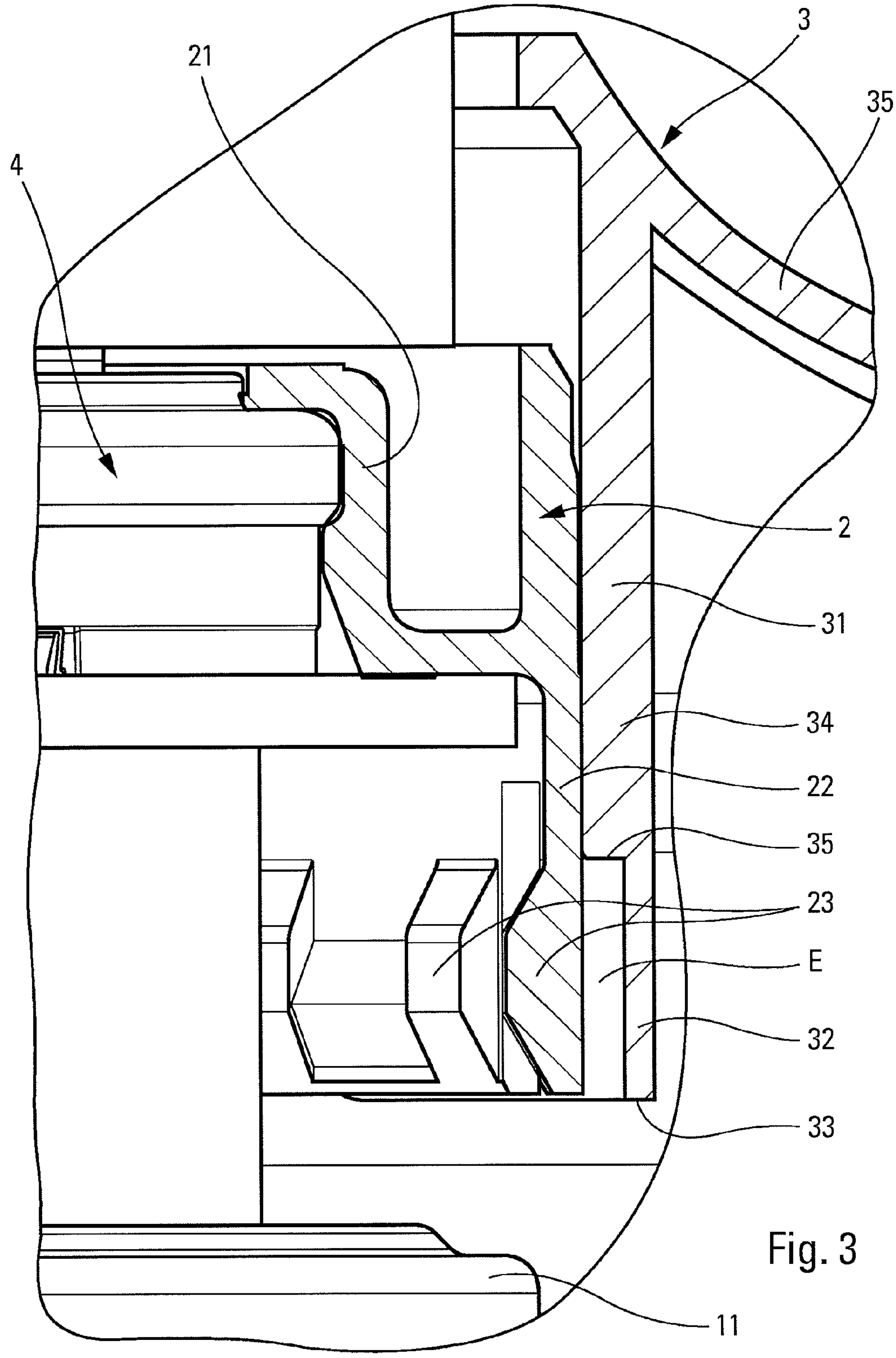

In the figures:

FIGS. 1 and 2 are vertical-section views through a fluid dispenser device using a fastener device of the invention, respectively in the provisional pre-assembled position and in the final assembled position; and FIG. 3 is a very greatly enlarged view of a detail of FIG. 1.

Reference is made to the figures in order to describe in detail a fluid dispenser constituting a non-limiting embodiment of the present invention. The dispenser comprises a plurality of component elements, namely: a fluid reservoir 1; a fastener ring 2; a blocking and covering piece 3; a dispenser member; and a pusher 5. The dispenser member 4 can be a pump or a valve.

The reservoir 1 can be made of any appropriate material, e.g. glass, plastics material, metal, etc. In its top portion, the reservoir 1 defines a shoulder 13 from which there projects a neck 11 defining an opening that puts the inside of the reservoir into communication with the outside. The neck 11 is made with a reinforcement or annular flange 12 that projects radially outwards. The reinforcement 12 thus forms a bottom rim that serves as a fastener surface for the dispenser unit, as described below. This design is entirely conventional for a fluid reservoir in the fields of cosmetics, perfumery, or even pharmacy.

The piece 3, the dispenser member 4, and the pusher 5 form a dispenser unit that is pre-assembled before being assembled on the reservoir 1. The dispenser member 4 and the pusher 5 are not critical elements for the present invention, and they are therefore not described in detail. These elements are not directly involved in the present invention, which relates more particularly to the fastener system formed by the fastener ring 2 and a portion of the piece 3.

The fastener ring 2 is of a design that is entirely conventional for a conventional fastener system that implements a fastener ring that is blocked on the neck of a reservoir by means of a blocking hoop. The ring 2 thus includes reception means 21 for receiving, in stationary manner, the dispenser member 4. By way of example, the reception means 21 can be in the form of a snap-fastener housing in which a projecting collar of the body of the dispenser member is snap fastened. The particular shape of the reception means 21 is not critical for the present invention. The fastener ring 2 also includes a fastener skirt 22 having an outside shape that is substantially or completely cylindrical. The fastener skirt 22 internally forms one or more fastener profiles 23 that project radially inwards. By way of example, the fastener profile 23 can extend in continuous manner over the entire inner periphery of the skirt 22. In a variant, a plurality of profiles 23 can be distributed over the inner periphery of the skirt 22. The skirt 22 can be continuous so as to form a solid cylinder, or, in a variant, the skirt can be formed with slots that divide the skirt into a plurality of tabs, each formed with one or more fastener profiles 23. This is the situation in the figures. Whatever the configuration of the skirt 22 (and of its fastener profiles 23), it is radially deformable, so as to enable the fastener profiles 23 to be housed below the rim formed by the projecting reinforcement 12 of the neck 11, as can be seen in FIG. 1. To achieve this position, which can be said to be "snap-fastening", it is naturally necessary for the profiles 23 to pass over and beyond the reinforcement 12. For preformed inner profiles, it is necessary for the skirt 22 to deform radially outwards while passing over the reinforcement 12, so as then to be able to retract once again so that the profiles come into snap-fastened engagement below the rim 12. However, given the deformability of the skirt 12, secure fastening thereof below the reinforcement 12 cannot be guaranteed solely by the ring; it further requires a blocking element that prevents the skirt of the ring from deforming radially outwards once again, and thereby disengaging its fastener profiles 23 from below the reinforcement 12.

In the embodiment described herein, the blocking element is formed by a blocking hoop 31 that forms an integral part of the piece 3. This is only one particular non-limiting embodiment: the blocking hoop 31 could very well be made in separate and individual manner. The blocking hoop 31 is in the form of a substantially cylindrical segment that is engaged around the ring 2, and more precisely around the fastener skirt 22. The blocking hoop 31 can extend above the ring 2 by forming an inner rim that comes to bear on the top end of the ring. The inside surface of the hoop 31 comes into clamping engagement with the outside surface of the ring 2 in such a manner as to provide an assembly that is suitable for withstanding a predetermined traction force. It is even possible to provide special means that make it possible to increase the retention of the hoop on the ring. In another advantageous aspect of the invention, the blocking hoop 31 is surrounded by an outer covering hoop 36 that masks the hoop 31 in the final assembled position. The outer hoop may serve as an outer covering for the dispenser unit, imparting an attractive appearance thereto.

In the invention, the blocking hoop 31 also defines a clearance or extension section 32 that forms the bottom end edge 33 of the hoop 31. The clearance section 32 presents the distinctive feature of its inside surface being offset radially outwards relative to the inside surface of the remainder of the hoop in contact with the ring. It can also be said that the clearance section 32 presents an inside surface that is radially offset in such a manner as to form a recess or a step relative to the remainder of the hoop. More precisely, the top of the clearance section is connected to a blocking section 34 that is in blocking clamping contact around the fastener means of the ring in the final assembled position. Given that the clearance section is offset outwards, a downwardly-oriented internal shoulder 35 is formed by the blocking section 34: the shoulder 35 radially connects the ring to the clearance section 32. In the final assembled position as shown in FIG. 2, the clearance section 32 is disposed below the bottom end of the ring 2, and, as a result, does not co-operate at all with the ring. In order to achieve the final position, the pre-assembled unit constituted by the dispenser member, the ring, and the piece, is assembled on the neck of the reservoir by applying a downwardly-directed axial thrust force. In conventional manner, the fastener ring 2 is engaged initially around the neck 11 of the reservoir, then the blocking hoop 31 is lowered around the fastener profiles 23 of the ring so as to block them below the reinforcement 12 of the neck. To do this, the blocking hoop 31 is pre-assembled on the ring 2, but in such a manner that the hoop does not prevent the fastener profiles 23 from deforming radially outwards, so as to allow them to pass over the reinforcement 12. The provisional pre-assembled position is shown in FIG. 1, and in very greatly enlarged manner in FIG. 3. It can be seen that the dispenser member 4 is in place in the reception means 21, but that the blocking hoop 31 does not block the fastener means 23. The inside surface of the hoop 31 is not in clamping contact with the outside surface of the skirt 22 at the fastener profiles 23. In contrast, the bottom edge 33 of the hoop 31 extends down to the bottom end of the skirt 22, or very slightly below it. In reality, it is the clearance section 32 that is disposed level with the fastener profiles 23, but this section 32 does not come into contact with the skirt 22, since it is offset radially outwards. Intermediate clearance E is created in this way between the ring 22 and the extension section 32. The clearance E enables the skirt 22 to deform radially outwards while the profiles 23 are passing over the reinforcement 12. It should be observed that the internal shoulder 35 is situated above the fastener profiles 23: the blocking section 34 is in engagement with the skirt of the ring so as to hold the hoop on the ring, but it is not level with the fastener profiles 23.

Thus, in the pre-assembled position, the pre-assembled dispenser unit can be assembled on the neck of a reservoir by engaging the profiles 23 initially below the reinforcement 12, then by lowering the blocking hoop 31 in such a manner as to bring the hoop 31 into clamping contact with the ring 22 level with the fastener profiles 23. This can be done by offsetting the clearance section 32 downwards, as can be seen in FIG. 2.

By means of the clearance section 32, the bottom edge 33 of the hoop is situated level with the bottom edge of the ring in the provisional pre-assembled position. Without the clearance section 32, the fastener profiles 23 of the ring would project out from the hoop and would thus be exposed. In this embodiment, the clearance section 32 is made in the form of a reduction in the wall thickness of the hoop. It is also possible to make the clearance section 32 having wall thickness that is constant, but forming an outwardly-directed shoulder.

The invention claimed is:

1. A fastener device for fastening a dispenser member (4) on a neck (11) of a fluid reservoir (1) so as to constitute a fluid dispenser, the device comprising:

a fastener ring (2) including both reception means (21) for receiving the dispenser member (4), and fastener means (23) for coming into engagement around the neck (11) of the reservoir (1); and a blocking hoop (3) that is engaged around the ring (2) and that is movable axially relative to the ring between a provisional pre-assembled position and an final assembled position, the fastener means (23) of the ring being free to move radially outwards in the provisional pre-assembled position so as to make it possible to assemble the ring on the reservoir neck, the hoop (3) being engaged around the fastener means (23) of the ring so as to block them around the neck (11) in the final assembled position;

the fastener device being characterized in that the hoop (3) includes a clearance section (32) that, in the provisional pre-assembled position, is disposed around the fastener means (23), but with an intermediate clearance gap (E) separating them, so as to enable the fastener means (23) to move radially outwards without being hindered by the hoop (3), and is offset axially in the final assembled position relative to the fastener means (23), so as to enable the hoop to block the ring (2) on the neck (11).

2. The fastener device according to claim 1, wherein the ring (2) is inscribed entirely within the hoop (3) in the provisional pre-assembled position, the clearance section (32) masking the fastener means (23).

3. The fastener device according to claim 1, wherein the clearance section (32) presents a bottom end edge (33) that extends axially at least up to the same level as a bottom end of the ring (2).

4. The fastener device according to claim 1, wherein the clearance section (32) is connected to a blocking section (34) that comes to be engaged around the fastener means (23) in the final assembled position.

5. The fastener device according to claim 4, wherein the clearance section (32) presents a thinner wall relative to the blocking section (34).

6. The fastener device according to claim 4, wherein the blocking section (34) and the clearance section (32) are connected together forming an internal shoulder (35) that is situated axially above the fastener means (23) in the provisional position, and below the fastener means (23) in the final position.

7. The fastener device according to claim 1, wherein the fastener means include a skirt (22) that forms at least one fastener profile (23) that projects radially inwards.

8. The fastener device according to claim 1, wherein the blocking hoop (3) is surrounded by a covering hoop (36) that is advantageously formed integrally with the blocking hoop.

9. The fastener device according to claim 1, wherein the dispenser member is a pump or a valve.

10. A fluid dispenser comprising:

a fluid reservoir (1) having a neck (11) that projects from a reservoir body, the neck forming an external annular reinforcement (12);

a dispenser member (4); and a fastener device (2, 3) according to claim 1, the fastener means (23) coming to be engaged below the annular reinforcement (12) of the neck (11).

11. The dispenser according to claim 10, wherein the clearance section (32) comes into abutment against the reservoir (1) in the final assembled position.

12. The dispenser according to claim 9, wherein the dispenser member is a pump or a valve.

* * * * *